Oct. 24, 1944.   C. J. BURCH   2,360,934
METHOD OF AND APPARATUS FOR WELDING
Filed April 24, 1941
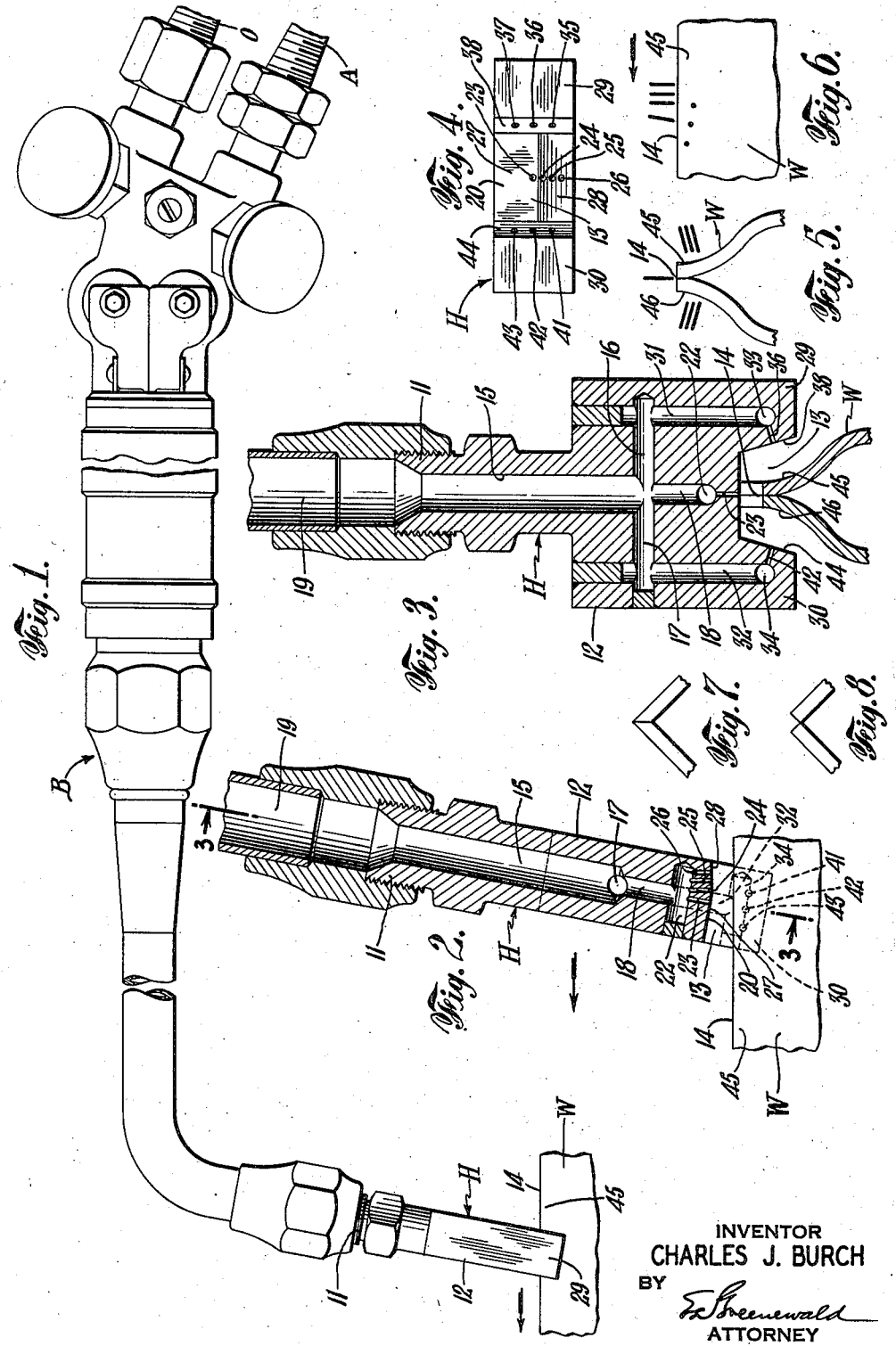
INVENTOR
CHARLES J. BURCH
BY
ATTORNEY Patented Oct. 24, 1944

2,360,934

UNITED STATES PATENT OFFICE 2,360,934

METHOD OF AND APPARATUS FOR WELDING

Charles J. Burch, Kenmore, N. Y., assignor to Union Carbide and Carbon Corporation, a corporation of New York Application April 24, 1941, Serial No. 390,041

14 Claims. (Cl. 113—112)

This invention relates to a method of and apparatus for welding, and more particularly to such a method and apparatus for welding seams at the corners or edges of sheet metal.

Among the objects of the invention are the provision of a method of welding a seam whereby a rounded bead of good appearance may be produced at high speeds and with good penetration; the provision of such a method which is economical in gas consumption; the provision of such a method which may be performed without a welding rod; and the provision of such a method which is particularly valuable for the welding of corner or edge seams in thin sheet metal.

Other objects of the invention are the provision of a novel welding head for performing the method of the invention, particularly for corner or edge welding; and the provision of such a welding head which will produce good welds even if shifted laterally from its normal position with respect to the seam during a welding operation.

The above and other objects, and the novel features of the invention, will become apparent from the following description having reference to the annexed drawing wherein:

Fig. 1 is a side elevational view of a welding head carried by the body of a blowtorch, and arranged to perform the method of the invention;

Fig. 2 is an enlarged view in vertical midsection of the welding head and a portion of the blowtorch of Fig. 1 arranged for welding a seam;

Fig. 3 is a sectional view taken along the line 3—3 of Fig. 2;

Fig. 4 is a bottom view of the welding head of Figs. 1 to 3, inclusive;

Figs. 5 and 6 are diagrammatic views showing the manner of application of flame jets to the work to be welded by the method of the invention; and Figs. 7 and 8 are views of two different types of corner joints which may be welded by the method of the invention.

In accordance with the invention there is provided a method of welding which comprises juxtaposing two sheets of metal to provide a seam, progressively heating the contiguous portions of said sheets to slightly below the fusion temperature thereof by applying preheating flames against regions on said sheets on opposite sides of said seam and spaced slightly therefrom, progressively fusing and welding together the metal along the seam by applying a welding flame substantially directly upon the seam, and producing relative movement between the seam and the flames.

More specifically in accordance with the invention, the contiguous portions of the sheets may be preheated by applying a plurality of separate but closely spaced preheating flame jets substantially normally against regions on opposite sides of the seam. The flame jets are arranged in two seamwise extending lines, each line being inclined forwardly toward the seam in the direction of the unwelded portion of the seam to provide an even and extended preheat of the base metal in an economical manner. Further, the fusing and welding step may be performed upon the hot metal smoothly and economically at a high speed, without burning through the metal along the seam, by confining the zone of fusion to a narrow zone on each side of the seam. This is accomplished by applying the welding flame as separate but closely spaced small welding flame jets arranged in a line and impinging substantially directly upon the seam, the flame jets being of sufficient heating intensity to fuse the metal. For the best results the line of welding jets lags behind and is arranged in overlapping relation to the previously mentioned two lines of preheating flame jets. The line of welding jets may include a leading flame jet inclined forwardly at an acute angle toward the unwelded parts of the seam for distribution of heat along the seam, and a plurality of flame jets following the leading jet and directed substantially normally toward the seam for rapid intense heating. Under some circumstances, it may be desirable to use elongated continuous line flames for preheating and welding, instead of a plurality of flame jets arranged in lines.

The method and apparatus of the invention will be described in detail hereinafter, by way of example only, in connection with the welding of edge and corner seams in thin sheet metal.

As shown in Fig. 1, the welding head H of the invention is threaded within the forward end of an ordinary welding blowpipe B which may be supplied with oxygen and acetylene gases, respectively, through the valve-controlled inlets O and A. The two gases may be mixed within the blowpipe B in any desired manner to provide a combustible gas mixture which then is delivered to the head H to provide on ignition flames for welding the work W. Although the blowtorch B and welding head H may be guided over the work by hand, rapid and steady operation may be obtained most advantageously if some means of mechanical propulsion is provided. For this purpose, the blowtorch B may be carried by any of the well-known mechanical propelling and guiding devices, such as the automatic welding and cutting machine shown in Patent 2,183,605, issued December 19, 1939, to J. H. Bucknam and A. J. Miller.

As shown more in detail in Figs. 2 and 3, the welding head H comprises an externally threaded narrow shank 11 integral at its lower end with a relatively wide body 12 having a groove or channel 13, which may be of regular trapezoidal shape, in its bottom face. The groove 13 is open at both ends to receive portions of metal members juxtaposed to form a corner or edge seam in the work W to be welded. As shown, by way of example, the work W may comprise two sheets of metal peaked adjacent to their edges to form contiguous parallel flanges having adjacent side surfaces in mutual contact, thereby providing an edge seam 14 within the groove 13. A central passage 15 in the head H extends through the shank 11 down into the body 12 for distributing combustible gas from a passage 19 in the blowtorch B to two lateral branch passages 16 and 17, and to a downwardly extending branch passage 18.

The downwardly extending passage 18 terminates at its lower end centrally in a horizontal header passage 22, from which header a plurality of small discharge passages 23, 24, 25 and 26 extend downwardly and have parts or outlets arranged centrally in the bottom wall 20 of the groove 13 and extending lengthwise thereof for discharging gas jets for a welding flame. As shown in Figs. 2 and 4, the bottom wall 20 of the groove 13 comprises a plane surface 27 substantially normal to the vertical axis of the head H, and a plane bevelled surface 28 inclined rearwardly and upwardly with respect to the plane surface 27. The leading welding gas discharge passage 23 is normal to the plane surface 27 and has an outlet in the surface 27 adjacent to the junction of the two surfaces 27 and 28; and the other three welding gas passages 24, 25, and 26, which are normal to the plane surface 28 and parallel to one another, are inclined downwardly away from the passage 23 and have outlets in the bevelled surface 28 aligned with the outlet of the passage 23. By this construction, the welding flame jets produced on ignition of the gas discharged from the passages 23, 24, 25, and 26 are separate but so close together as to constitute a substantially continuous line of flame.

The lateral passages 16 and 17 open at their outer ends into vertical passages 31 and 32, which in turn open into horizontal header passages 33 and 34, respectively, in the limbs 29 and 30 on opposite sides of the groove 13. Gas for preheating flames is discharged from the headers 33 and 34, respectively, through the two groups of discharge passages 35, 36, 37 having outlets arranged in a straight line in the side wall 38 of the groove 13, and 41, 42, 43 having outlets arranged in a straight line in the opposite side wall 44 of the groove 13. The two lines of gas outlets in the side walls 38 and 44 extend lengthwise of the groove 13, are substantially parallel to one another, and are arranged to discharge combustible gas jets toward one another. They are so arranged that a plane passing through the two lines will be substantially parallel to the plane surface 27 of the bottom wall 20, and substantially perpendicular to the plane containing the row of outlets of the passages 23, 24, 25, and 26.

For sustained welding, the welding head usually must be cooled to insure satisfactory operation. For this purpose, it may be desirable to provide additional passages in the head H for the circulation of cooling water, which may be introduced and discharged through suitable connections.

When welding a flange-type seam by the method of the invention, using the welding head described above, the projecting edges of the work W to be welded, which are in a common plane, are positioned within the groove 13 with the seam 14 directly under and in a plane with the central line of outlets of the passages 23, 24, 25, 26, as shown in Figs. 3, 5 and 6. The head H is tilted rearwardly at such an angle to the work that the bevelled plane surface 28 of the bottom wall 20 is substantially parallel to the seam 14, and the welding head is moved along the seam in any suitable manner in the direction of the arrows in Figs. 1 and 2. Because of the tilting of the welding head H, the lines of preheating flame jets formed by ignition of the gas discharged through the outlets of the side passages 35, 36, 37, and 41, 42, 43 are inclined forwardly toward the plane of the edge faces of the sheets 45 and 46, and the jets impinge against the opposite side surfaces 45 and 46 of the work W in staggered or echelon formation with respect to the seam 14 and the edge of the work, the regions of impingement of the several preheating flame jets on each side surface increasing progressively in distance from the seam, and from the plane of the edges of the work, from the front toward the rear of the head.

The welding flame jet applied by ignition of the gas delivered from the outlet of the leading central passage 23 is inclined forwardly and impinges against the seam at an acute angle thereto, thereby distributing its heat slightly along the seam and bringing the metal to its fusion temperature. Following the leading flame jet, the welding flame jets produced by ignition of the gas from the outlets of the passages 24, 25, and 26 impinge substantially normally against the seam, causing the metal of the two sheets to fuse and weld together smoothly and rapidly as the head H and the seam are moved relatively to one another. It is evident, of course, that relative movement between the seam 14 and the flames also may be obtained by moving the work relatively to a stationary welding head.

The manner of application of the preheating and welding flame jets themselves to the work W is shown diagrammatically in Figs. 5 and 6 to illustrate the substantially normal impingement of the preheating jets in echelon arrangement against regions spaced from the seam to be welded, and the manner of impingement of the overlapping line of welding flame jets along the edges of the sheets and substantially directly upon the seam. From these diagrams it may be seen that, if the welding head H is shifted laterally during a welding operation, the resultant offset of the line of welding flame jets to one side of the seam will be compensated by the movement of the preheating flame jets away from the work on the same side of the seam, and the closer approach of the preheating flame jets to the work on the opposite side of the seam.

The invention has been described in detail as applied to the welding of a flange type edge seam between two sheets of metal. It is evident, however, that the principles of the invention may be applied to the welding of corner seams such as shown in Figs. 7 and 8 wherein two angularly disposed sheets of metal are placed edge to edge. Moreover, edge seams between flat sheets of metal arranged with their adjacent side faces in mutual contact and with edge faces in a common plane, somewhat in the manner of the flanges 14, 14 in Figs. 3 and 5, may be welded in a similar manner. A single welding head of the type described may be used for welding seams between metal sheets disposed at various angles to one another as long as the preheating flame jets impinge substantially normally. For best results, however, it is best to employ a head designed for each particular type of work.

Specific embodiments of the method and apparatus of the invention have been described by way of illustration only. The invention, however, is capable of change and modification within the spirit and scope of the invention as defined in the claims appended hereto.

What is claimed is:

1. A method of welding which comprises juxtaposing two sheets of metal to provide a seam; progressively preheating the contiguous portions of said sheets by applying seamwise extending lines of preheating flames against regions on said sheets on opposite sides of said seam and spaced slightly therefrom, said lines being inclined forwardly toward said seam in the direction of the unwelded portion of said seam; and progressively fusing and welding together said sheets along said seam by applying a welding flame directly against the seam.

2. A method of welding which comprises juxtaposing two sheets of metal to provide a seam; progressively preheating the contiguous portions of said sheets by applying seamwise extending lines of preheating flames substantially normally against regions on opposite sides of said seam and spaced slightly therefrom, said lines being inclined forwardly toward said seam; and progressively fusing and welding together said sheets along said seam by applying a line of welding flame substantially directly upon the seam, said line of welding flame lagging behind and being arranged in overlapping relation to said lines of preheating flames.

3. A method of welding a seam between two juxtaposed sheets of metal, which method comprises progressively preheating the contiguous portions of said sheets to slightly below the fusion temperature thereof by applying seamwise extending lines of preheating flames against regions on opposite sides of said seam and spaced slightly therefrom; and progressively fusing and welding together said sheets along said seam by applying a line of welding flame jets substantially directly upon said seam, said line of welding jets including a leading flame jet inclined forwardly at an acute angle toward the seam, and a plurality of flame jets following said leading jet and directed substantially normally toward the seam.

4. A method of welding a seam between two juxtaposed sheets of metal, which comprises, progressively preheating the contiguous portions of said sheets to slightly below the fusion temperature thereof by applying two seamwise extending lines of preheating flame jets substantially normally against regions on opposite sides of said seam and spaced slightly therefrom, said lines being inclined forwardly toward said seam; and progressively fusing and welding together said sheets along said seam by applying a line of welding flame jets substantially directly upon said seam, said line of welding jets lagging behind and being arranged in overlapping relation to said lines of preheating jets, said line of welding jets including a leading flame jet inclined forwardly at an acute angle toward said seam and a plurality of flame jets following said leading flame jet and directed substantially normally toward said seam.

5. A method of welding which comprises juxtaposing two sheets of metal with adjacent side faces thereof in mutual contact and edge faces thereof substantially in a common plane to provide a seam; progressively heating said edge faces and the contacting portions of said side surfaces adjacent to said edge faces by applying seamwise extending lines of preheating flames against the opposite side surfaces of said sheets on regions thereof remote from the seam and spaced from said edge faces, said lines being inclined forwardly toward the plane of said edge faces; and progressively fusing and welding together the metal along said seam by applying a welding flame along said edge faces directly upon said seam.

6. A welding head having a groove adapted to receive portions of metal members juxtaposed to form a seam to be welded; passages in said head having a plurality of outlets in opposite side walls of said groove arranged to discharge combustible gas jets toward one another, the outlets in each side wall being arranged in a straight line substantially parallel to the line of outlets in the opposite side wall; a plurality of passages in said head having outlets arranged in a line substantially centrally in the wall at the bottom of said groove, some of said last-named passages being parallel to one another and inclined rearwardly to a plane through the lines of openings in said side walls, a leading one of said last-named passages being inclined forwardly away from the parallel passages; and means for supplying combustible gas to all of said passages.

7. A welding head having a groove adapted to receive portions of metal members juxtaposed to form a seam to be welded; passages in said head having outlets in opposite side walls of said groove arranged to discharge combustible gas jets toward one another, the outlets in each side wall being arranged in a straight line substantially parallel to the line of outlets in the opposite side wall; a plurality of passages in said head having outlets arranged in a line substantially centrally in the wall at the bottom of said groove, such last-named line overlapping a rear portion of the lines of outlets in said side walls, some of said last-named passages being parallel to one another and inclined rearwardly to a plane through the lines of outlets in said side walls, the forward one of said last-named passages being arranged between the lines of outlets in said side walls and being inclined forwardly away from said parallel passages; and means for supplying combustible gas to all of said passages.

8. A method of welding a seam between two juxtaposed sheets of metal, which comprises progressively preheating the contiguous portions of said sheets to slightly below the fusion temperature thereof by applying two seamwise extending lines of preheating flame jets substantially normally against regions on opposite sides of said seam and spaced slightly therefrom; said lines of jets being inclined forwardly toward said seam; and progressively fusing and welding together said sheets along said seam by applying a line of welding flame jets substantially directly against said seam, said line of welding jets including a leading flame jet inclined forwardly at an acute angle toward unwelded parts of said seam and a plurality of flame jets following said leading flame jet and directed substantially normally against said seam.

9. A method of welding which comprises juxtaposing two sheets of metal with adjacent side faces thereof in mutual contact and edge faces thereof substantially in a common plane, to provide a seam; progressively preheating said edge faces and the contacting portions of said side faces adjacent to said edge faces by applying seamwise extending lines of preheating flames against the opposite side faces of said sheets on regions thereof remote from the seam and spaced from said edge faces, said lines being inclined forwardly toward the plane of said edge faces; and progressively fusing and welding together the metal along said seam by applying a line of welding jets along said edge faces directly against said seam, said line of welding jets lagging behind and being arranged in overlapping relation to said lines of preheating jets.

10. A welding head having a groove adapted to receive portions of metal members juxtaposed to form a seam to be welded, said groove having side walls and being open at both ends; passages in said head having outlets in the side walls of said groove arranged to discharge preheating combustible gas jets toward one another; passage means in said head having outlet means arranged at the bottom of said groove for discharging a welding combustible gas jet or jets; and means for supplying combustible gas to all of said passages.

11. A welding head having a groove adapted to receive portions of metal members juxtaposed to form a seam to be welded, said groove having side walls and being open at both ends; passage means in said head having outlets in both side walls of said groove disposed in lines lengthwise thereof and arranged to discharge combustible gas jets toward one another to provide lines of preheating flames; combustible gas passage means in said head having port means arranged substantially centrally at the bottom of said groove forming a line extending lengthwise of said groove to provide a line of welding flame; and means for supplying combustible gas to all of said passage means.

12. A welding head as claimed in claim 11, wherein said port means overlaps said lines of outlets.

13. A method of welding which comprises juxtaposing two sheets of metal to provide a seam; progressively preheating the contiguous portions of said sheets by applying seamwise extending lines of preheating flames against regions on said sheets on opposite sides of said seam and spaced slightly therefrom, said lines being inclined forwardly toward said seam in the direction of the unwelded portion of said seam; and progressively fusing and welding together said sheets along said seam by applying welding flame thereto.

14. A welding head having a groove adapted to receive portions of metal members juxtaposed to form a seam to be welded, said groove having side walls and being open at both ends; passages in said head having outlets in the side walls of said groove, arranged to discharge preheating combustible gas jets toward one another; passage means in said head having outlet means arranged in a single line substantially centrally at the bottom of said groove for discharging a welding combustible gas jet or jets; and means for supplying combustible gas to all of said passages.

CHARLES J. BURCH.